(12) United States Patent
Nakanishi et al.

(10) Patent No.: US 9,023,552 B2
(45) Date of Patent: May 5, 2015

(54) MEMBRANE ELECTRODE ASSEMBLY, MANUFACTURING METHOD THEREOF, AND FUEL CELLS

(75) Inventors: Junji Nakanishi, Kasugai (JP); Kenji Tsubosaka, Susono (JP); Hiroo Yoshikawa, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 83 days.

(21) Appl. No.: 13/123,646

(22) PCT Filed: Sep. 15, 2010

(86) PCT No.: PCT/JP2010/005642
§ 371 (c)(1),
(2), (4) Date: Apr. 11, 2011

(87) PCT Pub. No.: WO2012/035579
PCT Pub. Date: Mar. 22, 2012

(65) Prior Publication Data
US 2012/0064430 A1    Mar. 15, 2012

(51) Int. Cl.
*H01M 8/10* (2006.01)
*H01M 8/02* (2006.01)
(Continued)

(52) U.S. Cl.
CPC .......... *H01M 8/1004* (2013.01); *H01M 8/1023* (2013.01); *H01M 8/1039* (2013.01); *H01M 8/1058* (2013.01); *H01M 8/0247* (2013.01); *H01M 8/0239* (2013.01); *H01M 4/8817* (2013.01); *H01M 4/881* (2013.01);
(Continued)

(58) Field of Classification Search
CPC . H01M 4/8817; H01M 4/8807; H01M 4/881; H01M 8/0239; H01M 8/0291; H01M 8/0245; H01M 8/1004; H01M 8/1023; H01M 2008/1095; Y02E 60/521
See application file for complete search history.

(56) References Cited

U.S. PATENT DOCUMENTS

| 8,048,586 B2 * | 11/2011 | Lee et al. ............. 429/457 |
| 2004/0214064 A1 * | 10/2004 | Cavalca et al. .......... 429/33 |
| 2005/0014060 A1 | 1/2005 | Suzuki |

(Continued)

FOREIGN PATENT DOCUMENTS

| CA | 2 640 726 A1 | 8/2007 |
| JP | 11-16594 A | 1/1999 |

(Continued)

OTHER PUBLICATIONS

English machine translation of Asano JP2008-235159, Oct. 2, 2008.*

(Continued)

*Primary Examiner* — Ula C Ruddock
*Assistant Examiner* — Lisa S Park Gehrke
(74) *Attorney, Agent, or Firm* — Sughrue Mion, PLLC

(57) ABSTRACT

The membrane electrode assembly 100 has an electrolyte layer 10, a catalyst layer 20, and a member 15 impregnated with electrolyte which is arranged between the electrolyte layer 10 and the catalyst layer 20. At least part of the peripheral edge portion of the member 15 extends the outside the peripheral edge portions of the electrolyte layer and the catalyst layer 20. With this kind of constitution, it is possible to easily separate the electrolyte layer 10 or the catalyst layer 20 from the member 15 from the extended portion of the member 15. Consequently, it is possible to easily replace the electrolyte layer 10 and the catalyst layer 20.

3 Claims, 15 Drawing Sheets

(51) Int. Cl.
  *H01M 4/88* (2006.01)
  *H01M 4/92* (2006.01)

(52) U.S. Cl.
  CPC ........ *H01M 4/92* (2013.01); *H01M 2300/0082* (2013.01); *Y02E 60/521* (2013.01)

(56) References Cited

U.S. PATENT DOCUMENTS

| | | |
|---|---|---|
| 2006/0029850 A1 | 2/2006 | Szrama et al. |
| 2007/0003817 A1* | 1/2007 | Umeda et al. .................. 429/40 |
| 2007/0184326 A1 | 8/2007 | Sompalli et al. |
| 2007/0275291 A1* | 11/2007 | Gu et al. ........................ 429/44 |
| 2008/0118814 A1 | 5/2008 | Lee et al. |
| 2009/0208805 A1 | 8/2009 | Wakabayashi et al. |
| 2010/0200161 A1 | 8/2010 | Kato |

FOREIGN PATENT DOCUMENTS

| | | |
|---|---|---|
| JP | 2001-126737 A | 5/2001 |
| JP | 2004-220843 A | 8/2004 |
| JP | 2005-209479 A | 8/2005 |
| JP | 2006-278070 A | 10/2006 |
| JP | 2007-035612 A | 2/2007 |
| JP | 2008-146985 A | 6/2008 |
| JP | 2008-235159 A | 10/2008 |
| JP | 2009-032458 A | 2/2009 |
| JP | 2009-032503 A | 2/2009 |
| JP | 2010-92636 A | 4/2010 |
| JP | 2010-123511 A | 6/2010 |
| JP | 2010-198763 A | 9/2010 |
| JP | 2010-198903 A | 9/2010 |
| KR | 100829553 B1 | 5/2008 |
| WO | 2004/040679 A1 | 5/2004 |

OTHER PUBLICATIONS

"On the Design of Bandages", http://neozaz.wordpress.com/2008/04/07/on-the-design-of-bandages/, published online Apr. 7, 2008.*

* cited by examiner

MEMBRANE ELECTRODE ASSEMBLY, MANUFACTURING METHOD THEREOF, AND FUEL CELLS

CROSS REFERENCE TO RELATED APPLICATION

This application is a National Stage of International Application No. National Stage Entry of PCT/JP2010/005642 filed on Sep. 15, 2010, the contents of all of which are incorporated herein by reference in their entirety.

BACKGROUND OF THE INVENTION

1. Field of the Invention

The present invention relates to a membrane electrode assembly, a manufacturing method thereof, and fuel cells.

2. Background Art

A membrane electrode assembly (hereafter also called MEA) used for a fuel cell is constituted by laminating on each surface of an electrolyte membrane a catalyst layer and a gas diffusion layer. A membrane electrode assembly with a gas diffusion layer is also specifically called a MEGA. Regarding the membrane electrode assembly, for example in Patent Reference 1, disclosed is technology which breaks down the membrane electrode assembly by introducing a volume expanding material (e.g. water) into the catalyst layer, and by expanding this volume expansion material.

However, with this technology, because the catalyst layer is damaged by the breaking down of the membrane electrode assembly, it is difficult to perform replacement and repairs of an individual structural part of the membrane electrode assembly.

JP2009-32458A
JP2007-35612A
JP2005-209479A
JP2008-235159A

SUMMARY OF THE INVENTION

Considering the issues described above, the problem to be addressed by the present invention is to provide technology that makes it possible to easily perform replacement of structural parts of the membrane electrode assemblies such as MEA and MEGA.

The present invention is made to address at least part of the problems described above, and may be realized as the following modes or application examples.

Application Example 1

A membrane electrode assembly comprises: an electrolyte layer; a catalyst layer: and a member arranged between the electrolyte layer and the catalyst layer, the member being impregnated with electrolyte, wherein at least a part of a peripheral edge portion of the member extends outside peripheral edge portions of the electrolyte layer and the catalyst layer. With this kind of constitution, it is possible to easily separate the electrolyte layer or the catalyst layer from the extended portion of the member impregnated with electrolyte. Consequently, it is possible to easily perform replacement of the electrolyte layer or the catalyst layer. Note that as the member impregnated with electrolyte, it is possible to use a porous member impregnated with electrolyte or an electrolyte membrane. As this electrolyte membrane, it is preferable to use a material that is different from that of the electrolyte layer.

Application Example 2

With the membrane electrode assembly as noted in Application Example 1, a tab portion is provided at the part of the member extending outside the peripheral edge portions of the electrolyte layer and the catalyst layer. With this kind of constitution, it is possible to easily separate the electrolyte layer or the catalyst layer using the tab portion.

Application Example 3

With the membrane electrode assembly as noted in Application Example 2, the tab portion is provided near a position at which cathode-off gas is exhausted from the membrane electrode assembly. With this kind of constitution, it is possible to perform the separation using the tab portion from near the cathode-off gas exhaust portion at which radical degradation doesn't occur easily.

Application Example 4

With the membrane electrode assembly as noted in any one of Application Examples 1 through 3, the member is provided in a plurality between the electrolyte layer and the catalyst layer. With this kind of constitution, it is possible to separate a plurality of members, and to easily replace the electrolyte layer or the catalyst layer.

Application Example 5

With the membrane electrode assembly as noted in any one of Application Examples 1 through 4, at least either one of the electrolyte layer and the catalyst layer has an elasticity rate of 500 MPa or greater. With this kind of constitution, it is possible to make it difficult for the electrolyte layer or the catalyst layer to be deformed, so it is possible to separate these members easily.

Application Example 6

A membrane electrode assembly comprises: an electrolyte layer; a catalyst layer; a gas diffusion layer; and a member having electric conductivity arranged between the catalyst layer and the gas diffusion layer, wherein at least a part of a peripheral edge portion of the member extends outside peripheral edge portions of the catalyst layer and the gas diffusion layer. With this kind of constitution, it is possible to easily separate the catalyst layer or the gas diffusion layer from the exposed portion of the member having electric conductivity. Consequently, it becomes possible to easily replace the catalyst layer or gas diffusion layer. Note that it is possible to use a porous member having electric conductivity as the member having electric conductivity, for example.

Application Example 7

With the membrane electrode assembly as noted in Application Example 6, a tab portion is provided at the part of the member extending outside the peripheral edge portions of the catalyst layer and the gas diffusion layer. With this kind of constitution, it is possible to easily separate the electrolyte layer or the catalyst layer using the tab portion.

Application Example 8

With the membrane electrode assembly as noted in Application Example 6 or 7, the member is provided in a plurality between the catalyst layer and the gas diffusion layer. With this kind of constitution, it is possible to separate the plurality of members, and to easily replace the catalyst layer or the gas diffusion layer.

Application Example 9

A method of manufacturing a membrane electrode assembly including an electrolyte layer and a catalyst layer, comprises the steps of: arranging a member between the electrolyte layer and the catalyst layer wherein at least a part of a peripheral edge portion of the member extends outside peripheral edge portions of the electrolyte layer and the catalyst layer; and impregnating electrolyte into the member. With this kind of manufacturing method, it is possible to provide a membrane electrode assembly for which it is possible to easily perform replacement of the electrolyte layer or the catalyst layer.

Application Example 10

A method of manufacturing a membrane electrode assembly including an electrolyte layer, a catalyst layer and a gas diffusion layer, comprises: arranging a conductive member between the catalyst layer and the gas diffusion layer wherein at least a part of a peripheral edge portion of the member extends outside peripheral edge portions of the catalyst layer and the gas diffusion layer. With this kind of manufacturing method, it is possible to provide a membrane electrode assembly for which it is possible to easily perform replacement of the catalyst layer or the gas diffusion layer.

Application Example 11

A fuel cell, comprises: a membrane electrolyte layer according to any one of Application Examples 1 through 8; and a separator adjacent to the membrane electrode assembly. In this way, the present invention may be realized as a fuel cell other than as a membrane electrode assembly.

DESCRIPTION OF THE PREFERRED EMBODIMENT

First Embodiment

Figure 1:
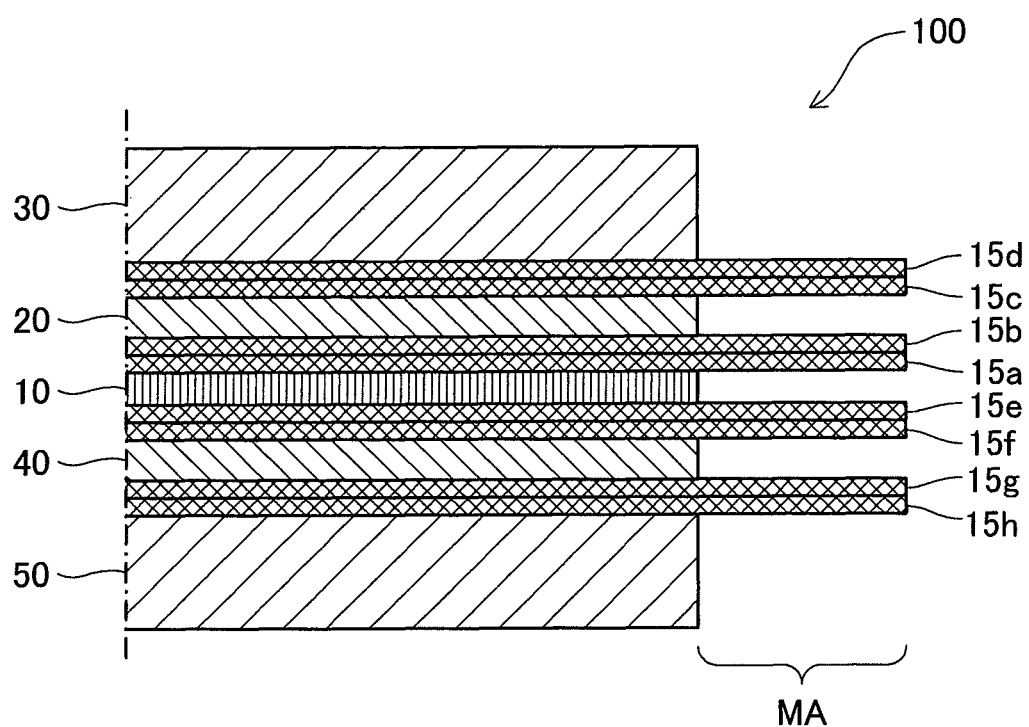
FIG. 1 is a partial cross section diagram showing the schematic structure of a membrane electrode assembly as a first embodiment.

Following, modes for embodying the present invention are described based on various embodiments while referring to the drawings. FIG. 1 is a partial cross section diagram showing the schematic structure of a membrane electrode assembly 100 as a first embodiment of the present invention. The membrane electrode assembly 100 of this embodiment includes an electrolyte layer 10; a cathode catalyst layer 20 and a cathode diffusion layer 30 which are disposed on one surface of the electrolyte surface 10; and an anode catalyst layer 40 and an anode diffusion layer 50 which are disposed on the other surface of the electrolyte layer 10. The electrolyte layer 10 and the cathode catalyst layer 20 are adjacent with each other via two porous members 15a and 15b therebetween, and the cathode catalyst layer 20 and the cathode diffusion layer 30 are adjacent with each other via two porous members 15c and 15d therebetween. Also, the electrolyte layer 10 and the anode catalyst layer 40 are adjacent with each other via two porous members 15e and 15f therebetween, and the anode catalyst layer 40 and the anode diffusion layer 50 are adjacent with each other via two porous members 15g and 15h therebetween. Note that there are cases when the porous members 15a to 15h are referred to collectively as the porous member(s) 15. Also, there are cases when the cathode catalyst layer 20 and the anode catalyst layer 40 are simply called "the catalyst layer(s)," and the cathode diffusion layer 30 and the anode diffusion layer 50 are simply called "the diffusion layer(s)."

The electrolyte layer 10 is made of a solid polymer electrolyte having proton conductivity (hereafter also called "ionomer"). In specific terms, it is possible to use a solid polymer electrolyte membrane made of a fluorinated sulfonic acid polymer resin (e.g. Nafion, registered trademark of Dupont). The catalyst layers 20 and 40 contain an ionomer and carbon particles supporting a catalyst such as platinum, a platinum alloy or the like. The diffusion layers 30 and 50 are made of materials having gas permeability as well as having electric conductivity. As a material for the diffusion layers 30 and 50, for example, it is possible to use a carbon type porous body such as carbon paper or carbon cloth or the like, or a metal porous body such as metal mesh, foam metal or the like.

The porous members 15 are thin film shaped reinforcing members, and for example may be generated by impregnating a PTFE resin film of thickness 2 μm and porosity 90% with an ionomer and catalyst. With this embodiment, the porosity of the porous members 15 is greater than the porosity of diffusion layers 30 and 50. Note that with this embodiment, all of the porous members 15a to 15h are impregnated with both an ionomer and catalyst, but it is also possible to impregnate only an ionomer in the porous members 15a, 15b, 15e, and 15f arranged between the electrolyte layer 10 and the catalyst layer 20. Also, if the porous members 15c, 15d, 15g, and 15h arranged between the catalyst layers 20 and 40 and the diffusion layers 30 and 50 have electric conductivity, it is also acceptable not to impregnate these porous members with an ionomer and a catalyst.

The edge portion MA of the porous members 15 is extended more toward the outside than those of the electrolyte layer 10, the cathode catalyst layer 20, the cathode diffusion layer 30, the anode catalyst layer 40, and the anode diffusion layer 50. In other words, when the membrane electrode assembly 100 is seen from the top surface or the bottom surface, the periphery of the porous member 15 is exposed to the outside from the electrolyte layer 10, the cathode catalyst layer 20, the cathode diffusion layer 30, the anode catalyst layer 40, and the anode diffusion layer 50.

The membrane electrode assembly 100 of this embodiment, as described above, has two sheets of the porous members 15 arranged at respective intermediate boundaries between neighboring structural parts (the electrolyte layer 10, the cathode catalyst layer 20, the cathode diffusion layer 30, the anode catalyst layer 40, and the anode diffusion layer 50). Accordingly, by separating two sheets of the porous members 15, it is possible to easily replace the individual structural parts of the membrane electrode assembly 100.

Figure 2:
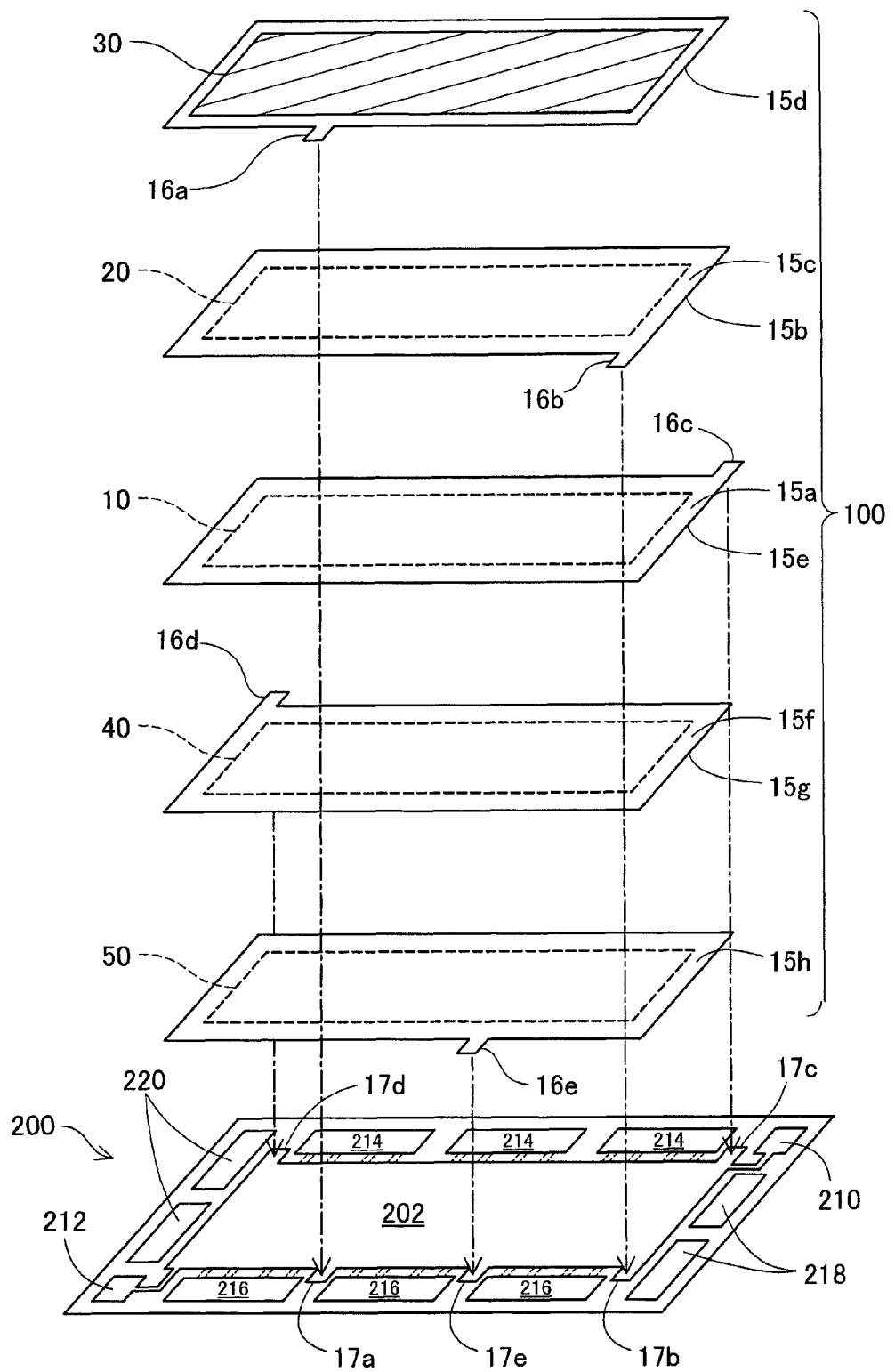
FIG. 2 is an exploded perspective view of the membrane electrode assembly.
Figure 3:
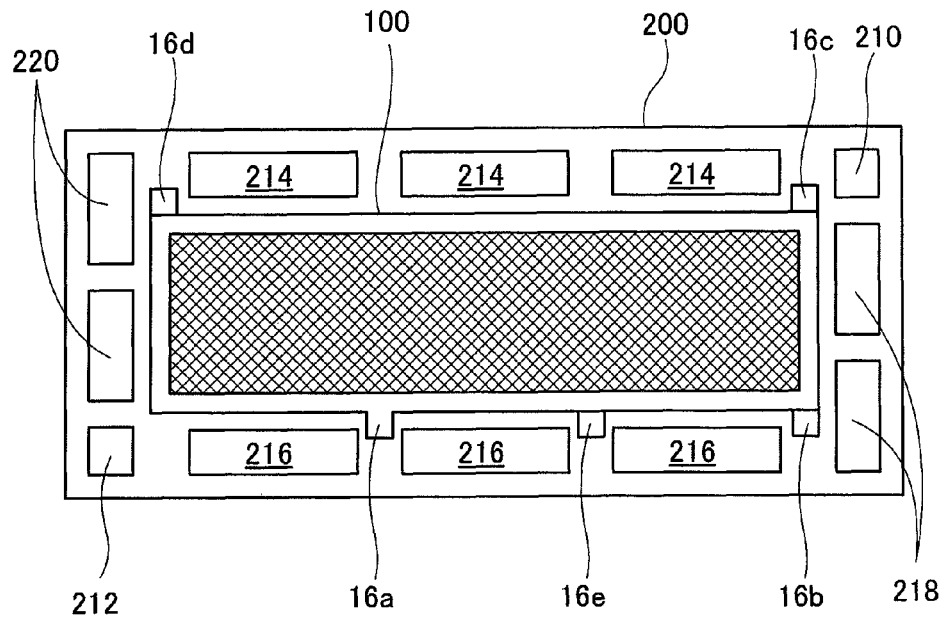
FIG. 3 is a drawing showing the state with the membrane electrode assembly incorporated in a separator.

FIG. 2 is an exploded perspective view of the membrane electrode assembly. FIG. 3 is a drawing showing the state with the membrane electrode assembly is put together with separators 200. At the peripheral edge portions of the separators 200 are formed: an air supply opening 216 for supplying air as an oxidation gas on the cathode side of the membrane electrode assembly 100; a cathode-off gas exhaust opening 214 for exhausting cathode-off gas from the cathode side; a hydrogen supplying opening 210 for supplying hydrogen as the fuel gas to the anode side of the membrane electrode assembly 100; an anode-off gas exhaust opening 212 for exhausting to the outside the anode-off gas from the anode side; a cooling water supplying opening 218 for supplying cooling water between the two separators 200 for which their back surfaces are adjacent to each other; and a cooling water exhaust opening 220 for exhausting this cooling water. The openings 210, 212, 214, 216, 218, and 220 and the separator's outer periphery portions are provided with a gasket (not illustrated) for ensuring gas sealing.

As shown in FIG. 2, with this embodiment, tab portions 16a, 16b, 16c, 16d, and 16e that may be grasped by human fingers are formed at different positions respectively on the porous member 15d arranged on the bottom surface of the cathode diffusion layer 30, the porous member 15c and the porous member 15b that sandwich the cathode catalyst layer 20 from both surfaces, the porous member 15a and the porous member 15e that sandwich the electrolyte layer 10 from both surfaces, the porous member 15f and the porous member 15g that sandwich the anode catalyst layer 40 from both surfaces, and the porous member 15h arranged on the top surface of the anode diffusion layer 50. Hereafter, these tab portions 16a to 16e are sometimes referred to collectively as "the tab portions 16." By grasping the tab portions 16 with human fingers and pulling apart porous members 15 that are adjacent to each other, the worker may easily perform replacement of the structural parts. Also, for example, square shaped jigs may be prepared such that each jig encloses the periphery of the membrane electrode assembly 100 with cutouts at the positions of the tab portions 16 other than a specific tab portion 16 which will be pulled apart. When the periphery of the membrane electrode assembly 100 is sandwiched from both sides with two sets of these jigs, only the specific tab portions 16 are cramped between the jigs. If the two sets of jigs are moved in the lamination direction of the membrane electrode assembly 100, it is possible to easily separate the target structural part.

A single fuel cell is constituted by fitting into an indentation 202 formed at the center part of the separator 200 the anode diffusion layer 50, the anode catalyst layer 40, the electrolyte layer 10, the cathode catalyst layer 20, and the cathode diffusion layer 30 equipped with the tab portions 16 and the porous members 15 as noted above in this sequence, and by further covering the other separator 200 over the top surface. At this time, the tab portions 16a, 16b, 16c, 16d, and 16e formed at the outer periphery of the porous members 15 are respectively sandwiched by the tab fitting portions 17a, 17b, 17c, 17d, and 17e provided at the outer periphery of the indentation 202. Following, there are cases when the tab fitting portions 17a, 17b, 17c, 17d, and 17e are collectively referred to as "the tab fitting portions 17." In this way, with this embodiment, because each tab portion 16 is fit in the tab fitting part 17 provided at the outer periphery of the indentation 202 of the separator 200, positioning is easy when arranging each structural part of the membrane electrode assembly 100 within the separator 200. Also, each tab portion 16 is provided at a different position for each structural part of the membrane electrode assembly 100, so when incorporating each structural part in the separator 200, it is possible to suppress wrongly incorporating the front and back. Note that with this embodiment, each structural part of the membrane electrode assembly 100 is fit in sequence into the separator 200, but it is also possible to fit each structural part into the separator 200 after putting them together into a single unit as the membrane electrode assembly 100. In this case, with some jigs, etc. for making each structural part into a single unit, it is possible to easily do positioning using each tab portion 16.

As shown in FIG. 2 and FIG. 3, with this embodiment, the tab portion 16c formed on the porous members 15a and 15e that sandwich the electrolyte layer 10 is arranged near the cathode-off gas exhaust opening 214 for exhausting the cathode off gas. The vicinity of the air supply opening 216 for introducing air into the membrane electrode assembly 100 goes to a dry state during electricity generation, so there are cases when the electrolyte layer 10 is degraded due to the generation of radicals. Because of that, for example, if the tab portion 16c is provided near the air supply opening 216, peeling of the electrolyte layer 10 occurs from the degraded portion, so the composition of the electrolyte layer 10 breaks down, and it is possible that peeling will become difficult. However, with this embodiment, the tab portion 16c is provided near the air exhaust opening 214 for which degradation due to radicals does not occur easily, so it becomes possible to easily separate the electrolyte layer 10. Also, for the cathode catalyst layer 20, degradation due to oxidation occurs easily near the cathode-off gas exhaust opening 214, but with this embodiment, the tab portion 16b is provided near the air supply opening 216 at the porous members 15b and 15c that sandwich this cathode catalyst layer 20. Because of that, it becomes easy to separate the cathode catalyst layer 20 as well. Furthermore, with this embodiment, as shown in FIG. 3, the tab portions 16 are provided at the positions between the openings of the separator 200 (said another way, at the beam portions), and these positions do not obstruct the original openings locations. Accordingly, there is no inhibition of the flow of air or hydrogen, and it is possible to suppress a decrease in the electrode usage rate.

Figure 4:
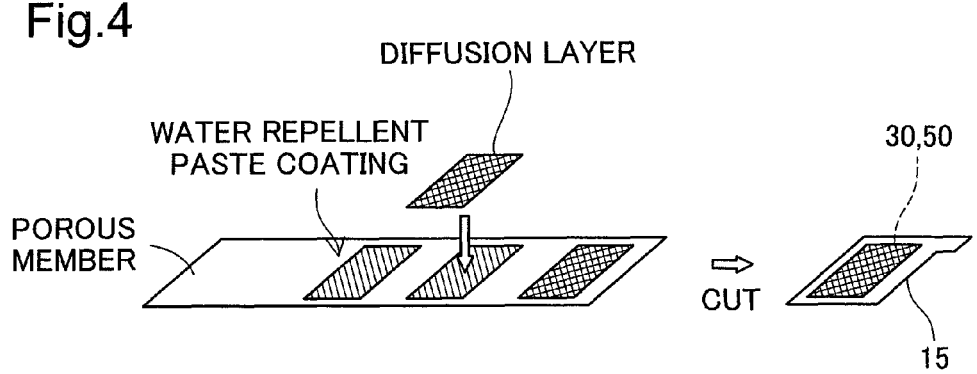
FIG. 4 is a drawing showing a method of adhering a porous member to a diffusion layer.

FIG. 4 is a drawing showing a method of adhering the porous member 15 to the diffusion layer 30 or 50. With this embodiment, a sheet shaped porous member impregnated in advance with an ionomer and catalyst is prepared, and then a water repellent paste is coated on the porous member in order to prevent occurrence of flooding during electricity generation, and then the diffusion layer 30 or 50 formed in a designated shape in advance (carbon paper or carbon cloth) are overlaid, and then thermal pressure is applied to adhere them. Then, the porous member is cut so that the tab portion 16a is formed at the position as shown in FIG. 2. Consequently, the diffusion layers 30 and 50 for which the porous member 15 is formed on one surface are generated.

Figure 5:
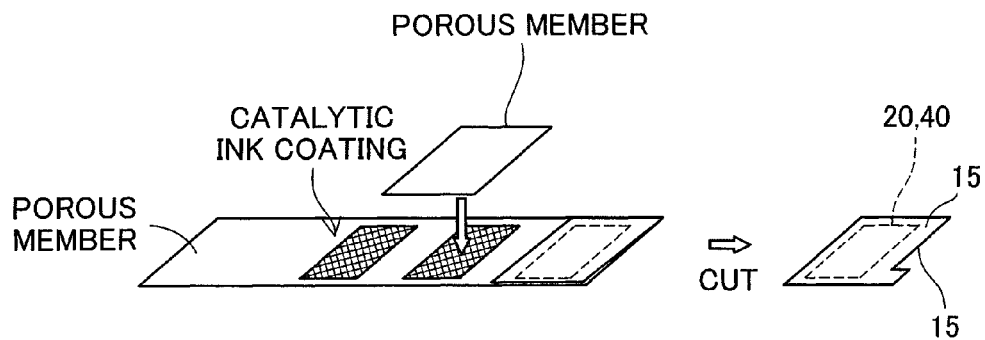
FIG. 5 is a drawing showing a method of adhering a porous member to a catalyst layer.

FIG. 5 is a drawing showing a method of adhering the porous member 15 to the catalyst layers 20 and 40. With this embodiment, a catalytic ink is coated on the sheet shaped porous member 15, and then a porous member cut in advance is adhered on that with thermal pressure applied. By working in this way, the ionomer and catalyst in the catalytic ink is impregnated in the two porous members. Then, two porous members are cut so that the tab portion 16b is formed at the position shown in FIG. 2. By working in this way, the catalyst layer 20 with porous members 15 arranged on both surfaces is generated.

Figure 6:
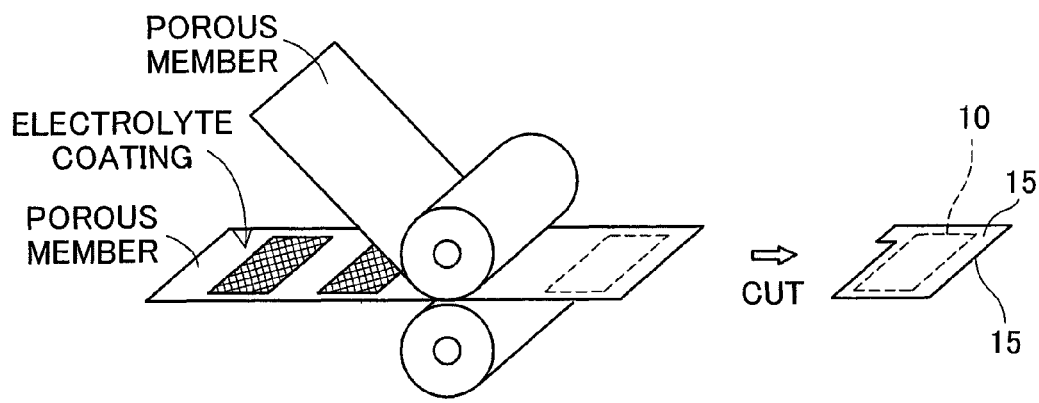
FIG. 6 is a drawing showing a method of adhering a porous member to an electrolyte layer.

FIG. 6 is a drawing showing a method of adhering the porous member 15 to the electrolyte layer 10. With this embodiment, first, on a sheet shaped porous member impregnated in advance with an ionomer and catalyst is coated an electrolyte or arranged an electrolyte membrane, and from above that, a sheet shaped porous member impregnated in advance with an ionomer and catalyst is adhered with application of thermal pressure. Then, the two porous members are cut so that the tab portion 16c is formed at the position shown in FIG. 2. By doing this, the electrolyte layer 10 for which the porous members 15 are arranged at both surfaces is generated. Note that it is also possible to impregnate an ionomer from the electrolyte layer 10 into the two porous members 15 that sandwich the electrolyte layer 10.

Note that with this embodiment, the electrolyte layer 10 or the catalyst layers 20, 40 or both are formed to have a degree of elasticity of 500 MPa or greater with an ambient temperature of 80 degrees centigrade and under dry conditions. Consequently, it is possible to increase the separatability of the electrolyte layer 10 and the catalyst layers 20 and 40. In one example, a hydrocarbon ionomer with a degree of elasticity of 2000 MPa was used for the electrolyte layer 10, and a fluorinated ionomer of degree of elasticity 200 MPa was used for the catalyst layers 20 and 40. Good separatability was maintained even after being used for some power generation. The peeling strength at that time was 0 N/cm$^2$ with the results of measurement using Autograph test machine.

Figure 7:
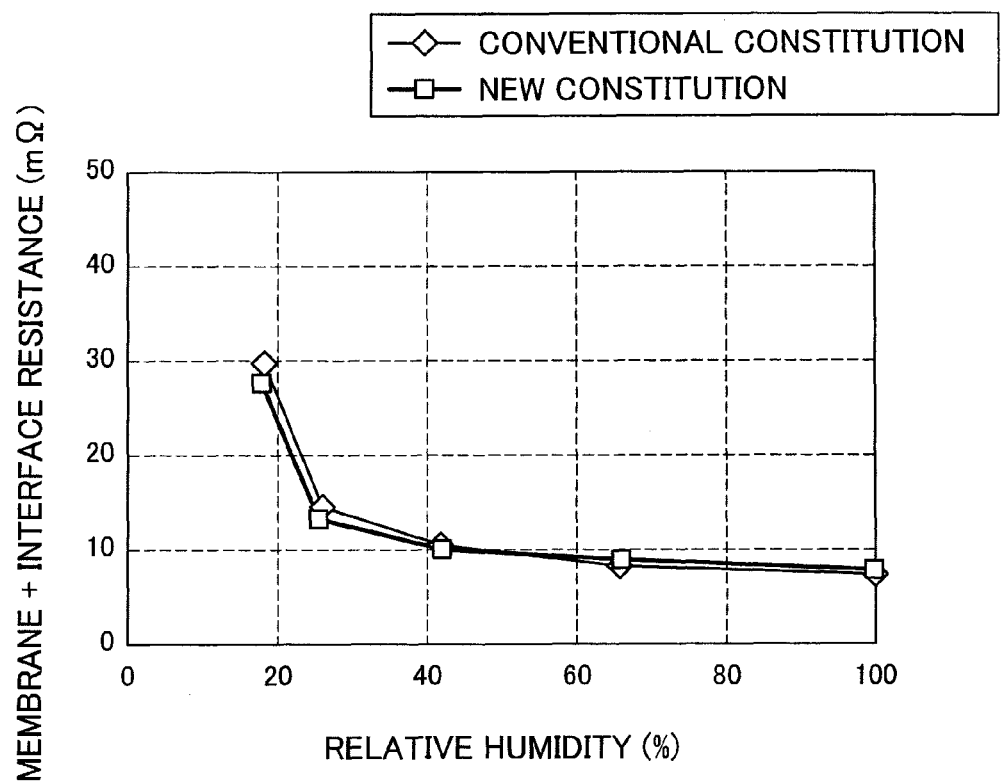
FIG. 7 is a graph showing the resistance value measurement results using the alternating current impedance method.

FIG. 7 is a graph showing the results of measuring the total of the membrane resistance and the interface resistance for the membrane electrode assembly 100 of this embodiment using the alternating current impedance method. With this graph, the horizontal axis represents the relative temperature of the electrolyte layer 10, and the vertical axis represents the total of the membrane resistance (resistance of the electrolyte layer 10) and the interface resistance (resistance at the interface of the electrolyte layer 10 and the catalyst layers 20 and 40). As shown in the drawing, even when the porous member 15 was arranged between each structural part of the membrane electrode assembly 100 as with this embodiment, a significant difference was not seen from the measurement results of a conventional membrane electrode assembly that was not equipped with a porous member 15. Thus, with this embodiment, it is possible to provide a constitution which effects easy replacement of each structural part without a decrease in power generation performance of the membrane electrode assembly 100.

With the membrane electrode assembly 100 of the first embodiment described above, two sheets of porous members 15 are arranged between respective structural parts. However, it is possible to use various modes for the arrangement of the porous members 15. There are described below other embodiments with different arrangements of the porous members 15.

Second Embodiment

Figure 8:
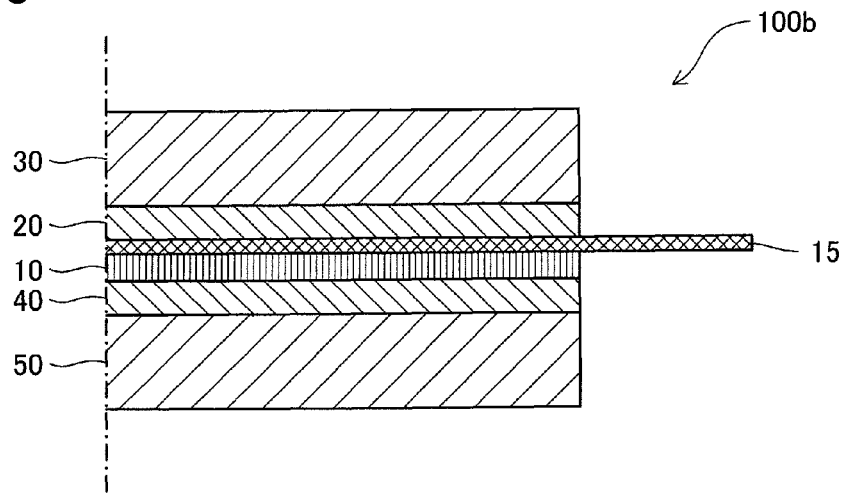
FIG. 8 is a partial cross section diagram showing the schematic structure of a membrane electrode assembly as the second embodiment.

FIG. 8 is a partial cross section diagram showing the schematic structure of a membrane electrode assembly 100b as the second embodiment. With this embodiment, only one porous member 15 is arranged between the electrolyte layer 10 and the cathode catalyst layer 20. With this kind of constitution, by performing peeling along the top surface or the bottom surface of the porous member 15, it is possible to easily replace the cathode catalyst layer 20. Besides, if one porous member 15 is provided between the electrolyte layer 10 and the anode catalyst layer 40, it is possible to easily replace the anode catalyst layer 40.

Figure 9:
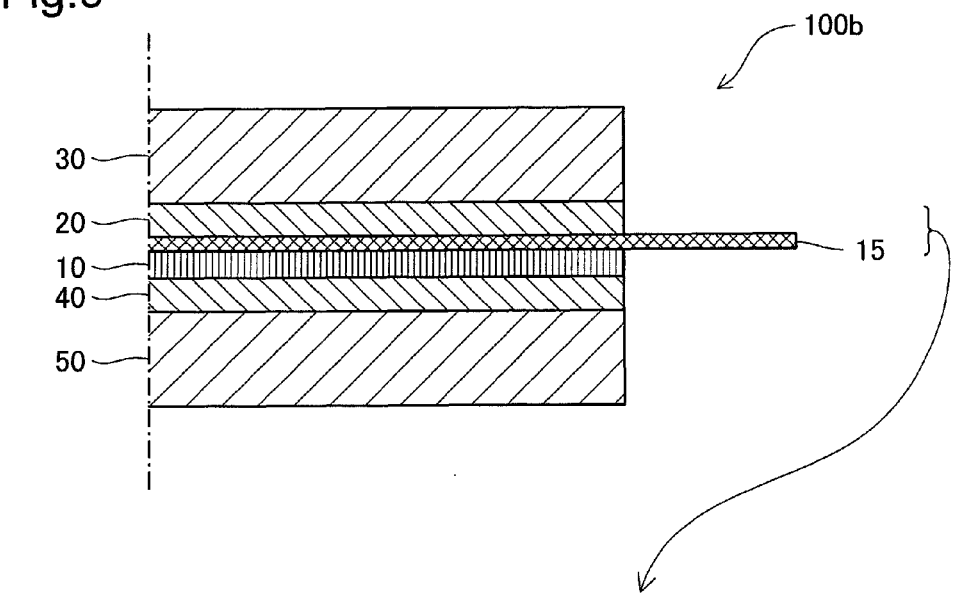
FIG. 9 is an explanatory drawing showing the method of arranging the porous member between the electrolyte layer and the catalyst layer.
Figure 9:
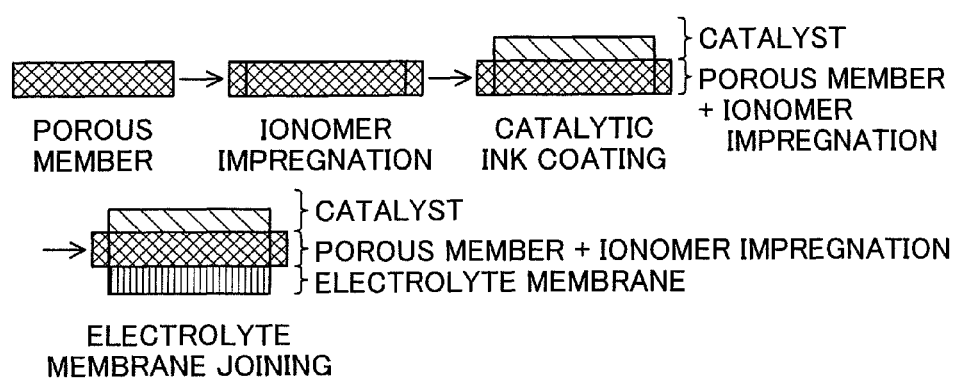

FIG. 9 is an explanatory drawing showing the method of arranging the porous member 15 between the electrolyte layer 10 and the catalyst layer 20 or 40. With this method, first, the porous member 15 is prepared, and that porous member 15 is impregnated with an ionomer. Then, a catalytic ink is coated on one surface of the porous member 15 that is impregnated with the ionomer, and an electrolyte membrane is joined to the other surface. By doing this, it is possible to arrange the porous member 15 between the electrolyte layer 10 and the catalyst layer 20 or 40.

Figure 10:
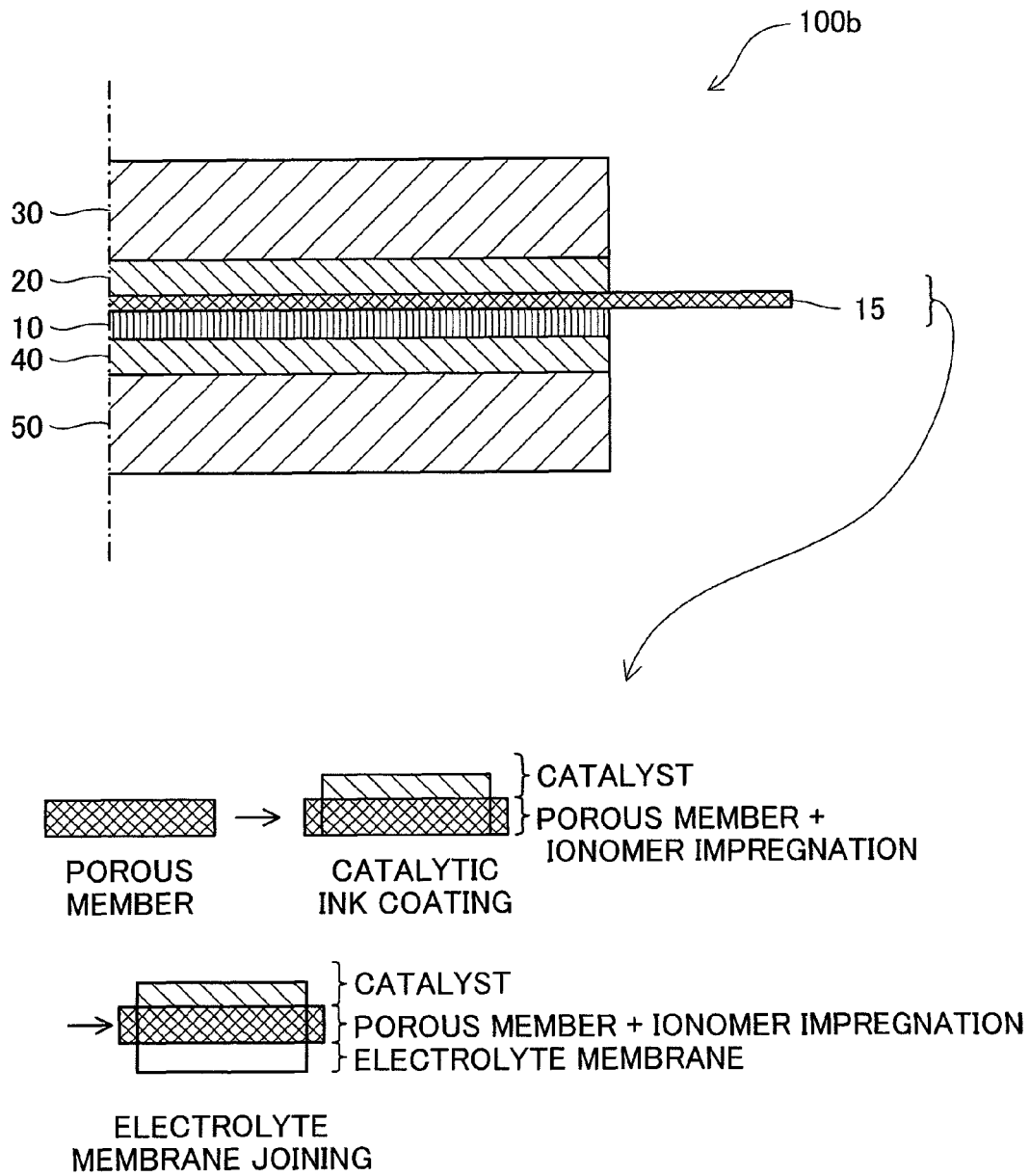
FIG. 10 is an explanatory drawing showing a second method of arranging the porous member between the electrolyte layer and the catalyst layer.

FIG. 10 is an explanatory drawing showing a second method of arranging the porous member 15 between the electrolyte layer 10 and the catalyst layer 20 or 40. With this method, first, the porous member 15 is prepared. Then, on one surface of that porous member 15, a catalytic ink with a higher ionomer content ratio than normal is coated. By doing this, the ionomer contained in the catalytic ink is impregnated in the porous member 15. Finally, an electrolyte membrane is joined to the other surface of the porous member 15. With this kind of method as well, it is possible to arrange the porous member 15 between the electrolyte layer 10 and the catalyst layer 20.

Figure 11:
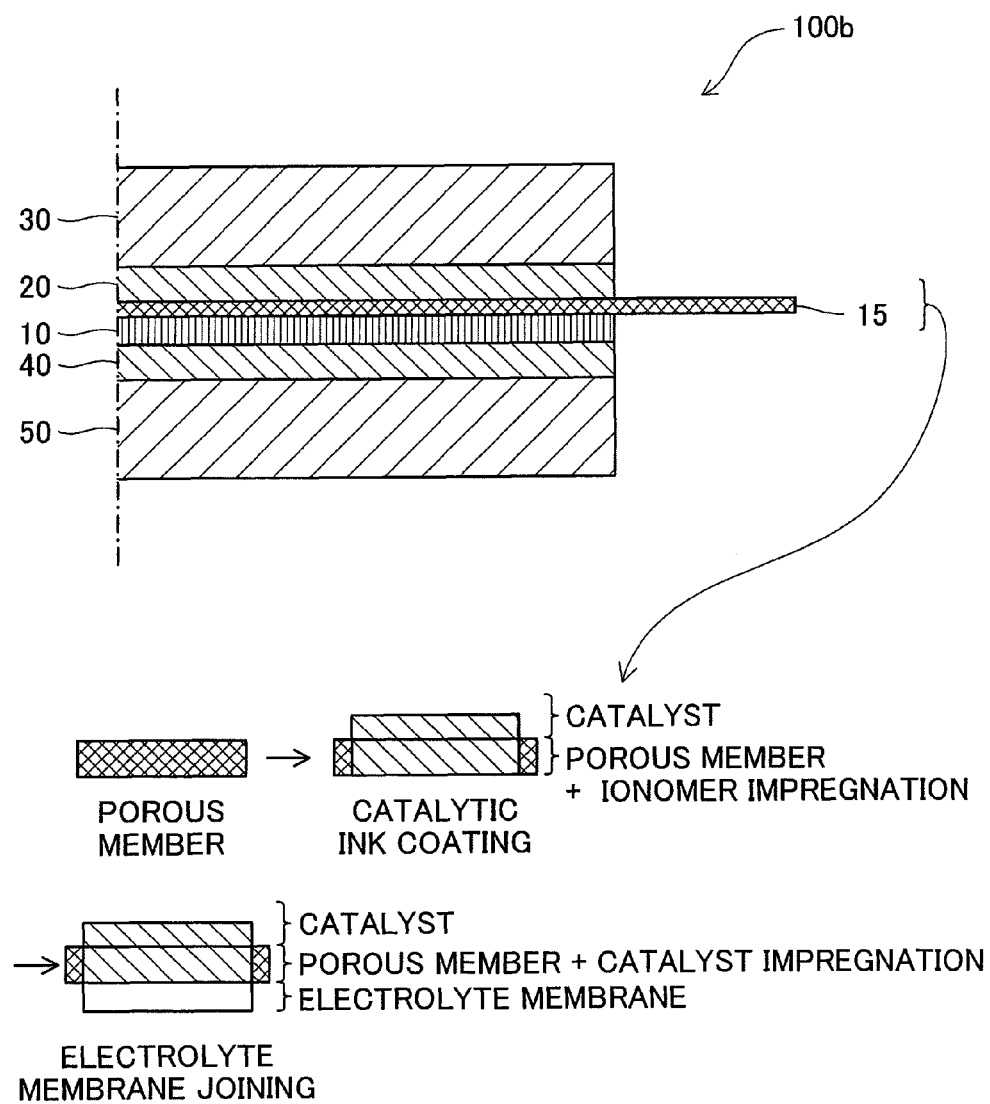
FIG. 11 is an explanatory drawing showing a third method of arranging the porous member between the electrolyte layer and the catalyst layer.

FIG. 11 is an explanatory drawing showing a third method of arranging the porous member 15 between the electrolyte layer 10 and the catalyst layer 20 or 40. With this method, first, a porous member 15 and a catalytic ink with a higher ionomer content ratio than normal are prepared. Then, a catalytic ink is applied to one surface of that porous member 15 so that the catalytic ink is impregnated into the interior. Finally, an electrolyte membrane is joined to the other surface of the porous member 15. With this kind of method as well, it is possible to arrange the porous member 15 between the electrolyte layer 10 and the catalyst layer 20.

Figure 12:
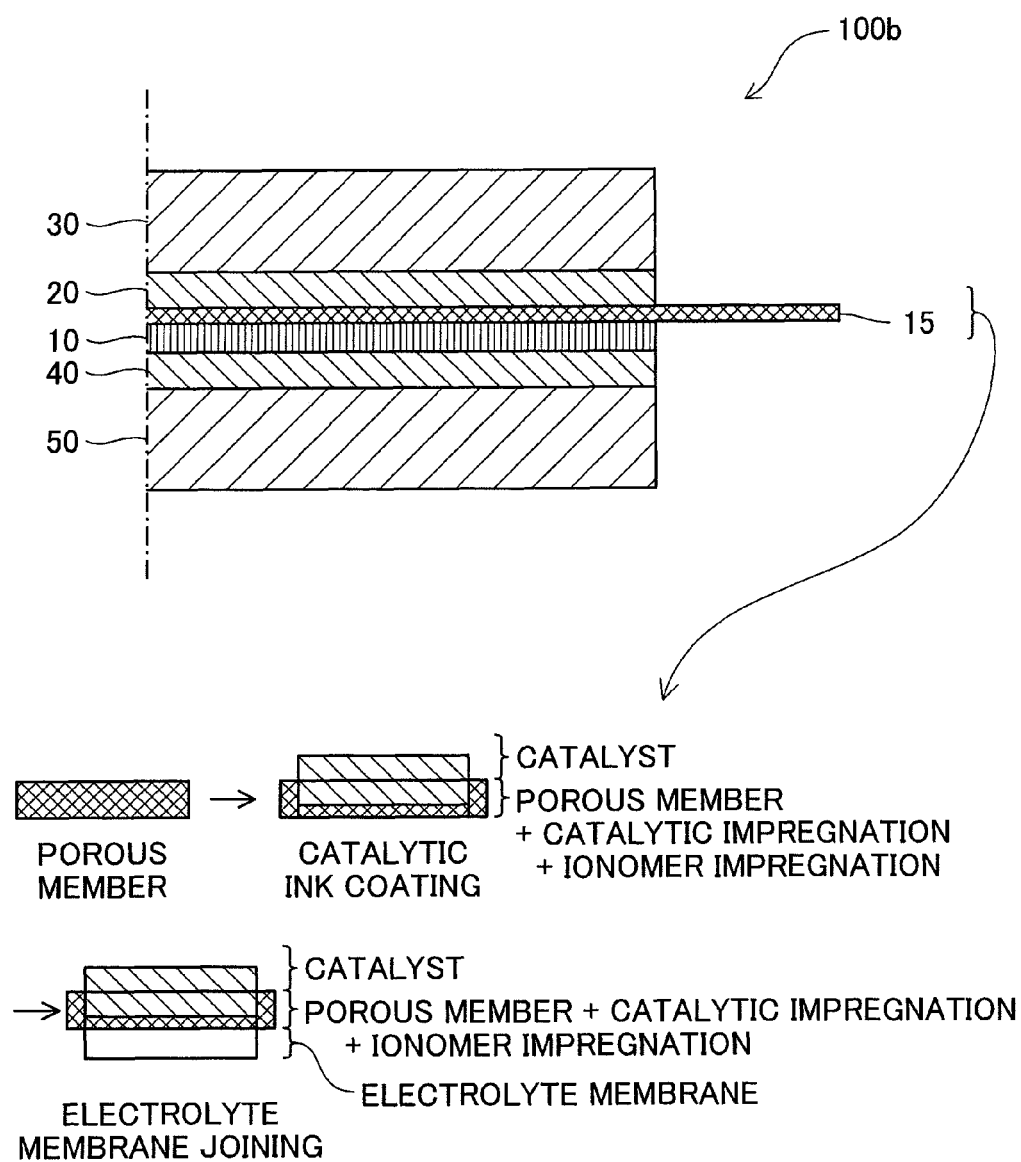
FIG. 12 is an explanatory drawing showing a fourth method of arranging the porous member between the electrolyte layer and the catalyst layer.

FIG. 12 is an explanatory drawing showing a fourth method of arranging the porous member 15 between the electrolyte layer 10 and the catalyst layer 20 or 40. With this method, first, a porous member 15 and a catalytic ink with a higher content ratio of ionomer than normal are prepared. Then, on one surface of that porous member 15, the catalytic ink is coated so that the catalytic ink is impregnated into the interior up to a deeper part of the porous member 15. Then, finally, an electrolyte member is joined to the other surface of the porous member 15. With this kind of method as well, it is possible to arrange the porous member 15 between the electrolyte layer 10 and the catalyst member 20 or 40.

Figure 13:
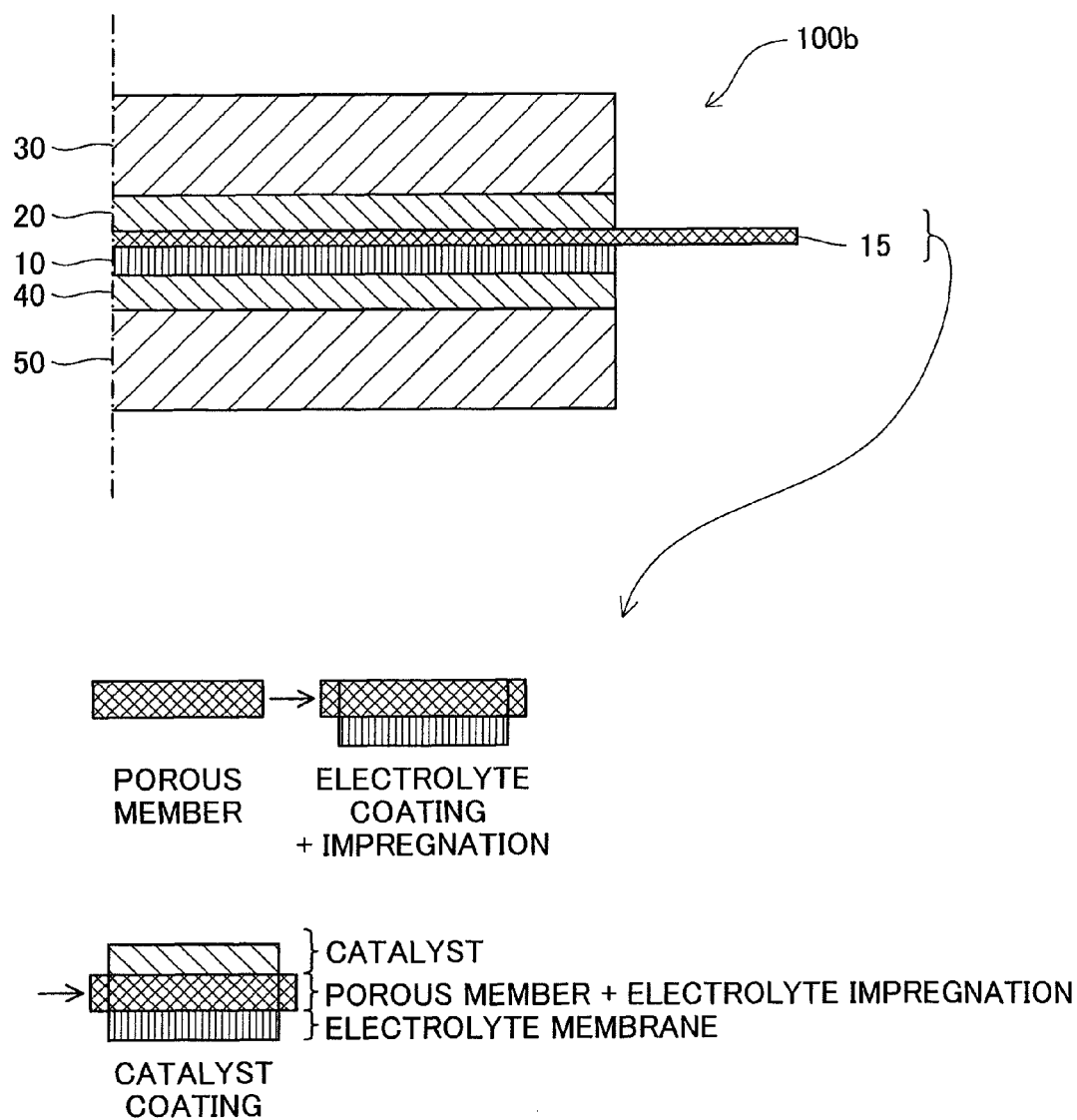
FIG. 13 is an explanatory drawing showing a fifth method of arranging the porous member between the electrolyte layer and the catalyst layer.

FIG. 13 is an explanatory drawing showing a fifth method of arranging the porous member 15 between the electrolyte layer 10 and the catalyst layer 20 or 40. With this method, first, the porous member 15 is prepared. Then, on one surface of that porous member 15, an electrolyte is coated to form the electrolyte layer 10. By doing this, the electrolyte is impregnated in the porous member 15 from this electrolyte layer 10. Finally, on the other surface of the porous member 15, a catalytic ink is coated to form the catalyst layer. In this way, even with impregnation of the electrolyte from the electrolyte layer 10 into the porous member 15, it is possible to arrange the porous member 15 between the electrolyte layer 10 and the catalyst layer 20 or 40.

Third Embodiment

Figure 14:
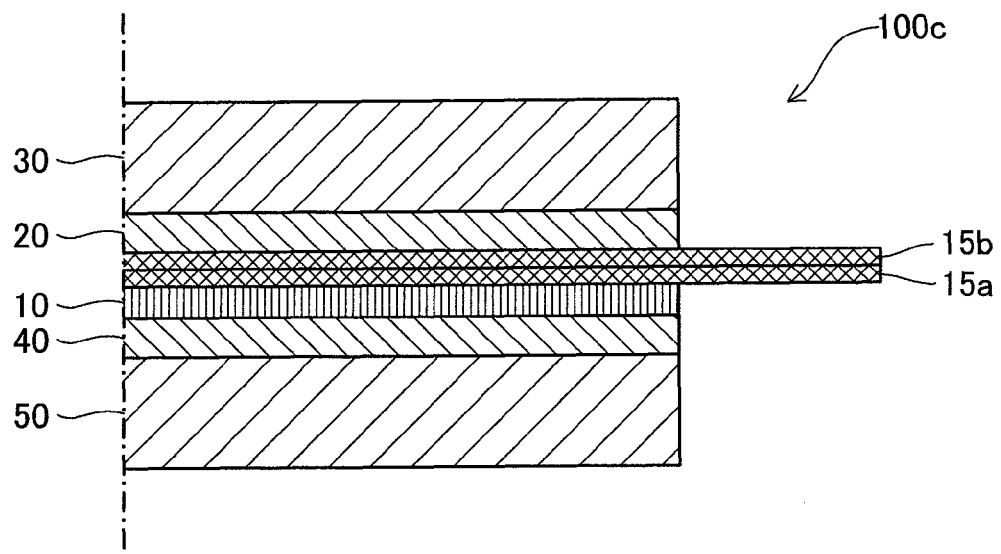
FIG. 14 is a partial cross section diagram showing the schematic structure of a membrane electrode assembly as the third embodiment.

FIG. 14 is a partial cross section diagram showing the schematic structure of a membrane electrode assembly 100c as the third embodiment. With this embodiment, two porous members 15a and 15b are arranged between the electrolyte layer 10 and the cathode catalyst layer 20. With this kind of constitution, it is possible to easily separate the electrolyte layer 10 and the cathode catalyst layer 20, without causing damage to the electrolyte layer 10 and the cathode catalyst layer 20. If two porous members 15 are provided between the electrolyte 10 and the anode catalyst layer 40, it is possible to easily separate the electrolyte layer 10 and the anode catalyst layer 40, without causing damage to the electrolyte layer 10 and the anode catalyst 40. Note that the methods of arranging two porous members 15 between the electrolyte layer 10 and the catalyst layer 20 or 40 may be obtained by substituting the single porous member 15 in the methods shown in FIGS. 9 to 13 with two porous members 15.

Fourth Embodiment

Figure 15:
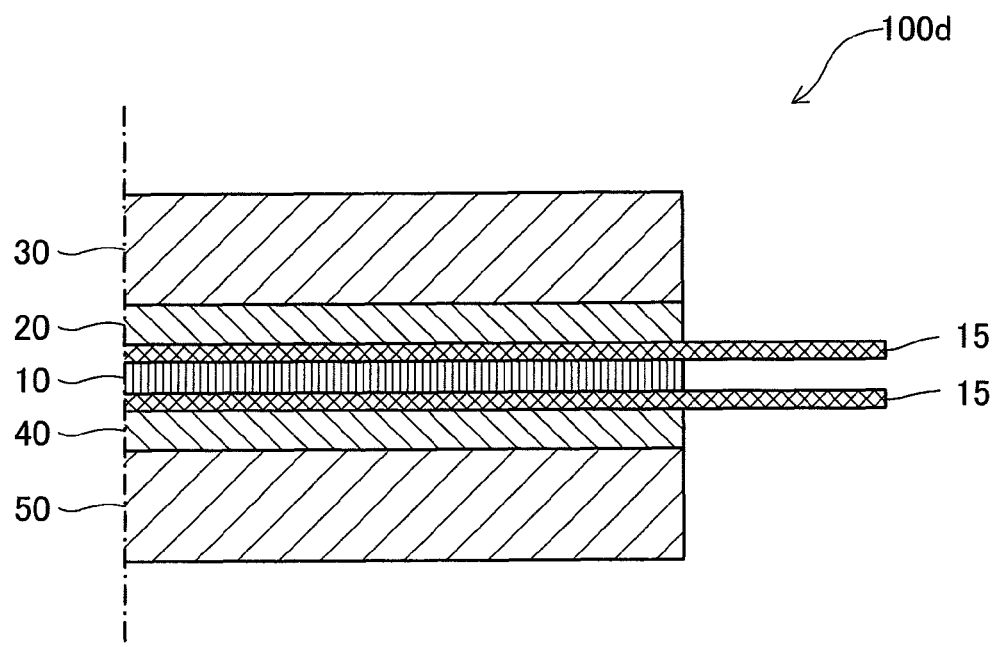
FIG. 15 is a partial cross section diagram showing the schematic structure of a membrane electrode assembly as the fourth embodiment.

FIG. 15 is a partial cross section diagram showing the schematic structure of a membrane electrode assembly 100d as the fourth embodiment. With this embodiment, one each of the porous member 15 is respectively arranged between the electrolyte layer 10 and the cathode catalyst layer 20, and between the electrolyte layer 10 and the anode catalyst layer 40. With this kind of constitution, by performing peeling respectively from the top surface or the bottom surface of the two porous members 15, it becomes possible to easily replace the electrolyte layer 10.

Fifth Embodiment

Figure 16:
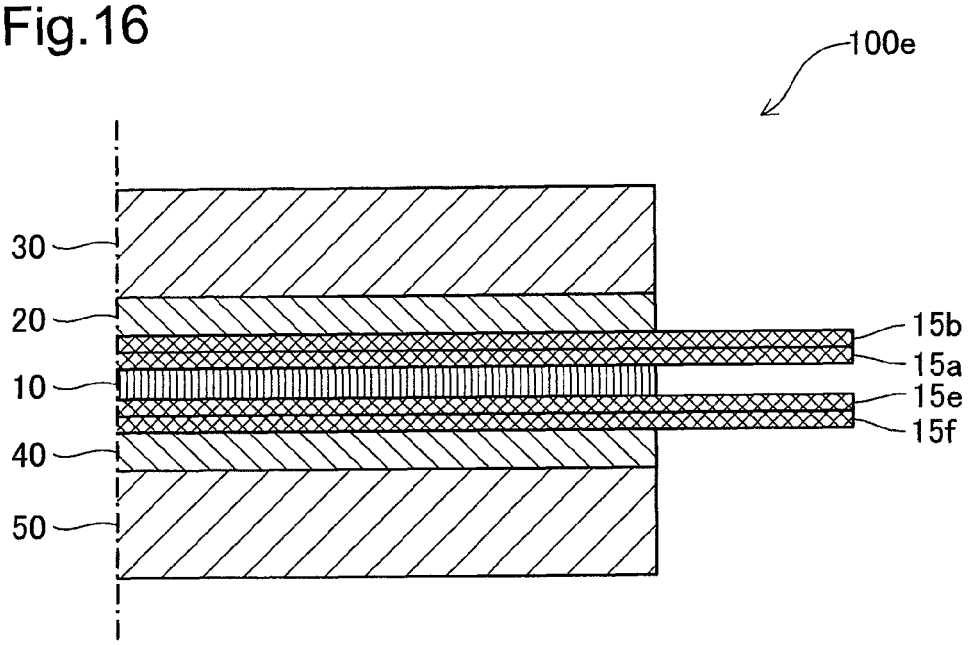
FIG. 16 is a partial cross section diagram showing the schematic structure of a membrane electrode assembly as the fifth embodiment.

FIG. 16 is a partial cross section diagram showing the schematic structure of a membrane electrode assembly 100e as the fifth embodiment. With this embodiment, two porous members 15 each are respectively arranged between the electrolyte layer 10 and the cathode catalyst layer 20, and between the electrolyte layer 10 and the anode catalyst layer 40. With this kind of constitution, it is possible to easily replace the electrolyte layer 10 without causing damage to the electrolyte layer 10 or the cathode catalyst layer 20 or the anode catalyst layer 40.

Sixth Embodiment

Figure 17:
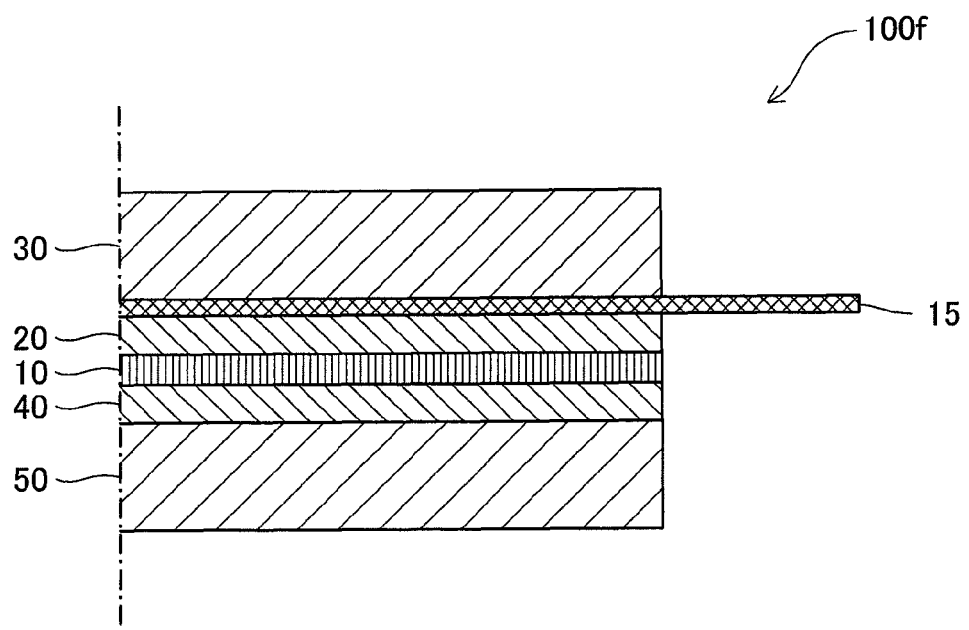
FIG. 17 is a partial cross section diagram showing the schematic structure of a membrane electrode assembly as the sixth embodiment.

FIG. 17 is a partial cross section diagram showing the schematic structure of a membrane electrode assembly 100f as the sixth embodiment. With this embodiment, only one porous member 15 is arranged between the cathode catalyst layer 20 and the cathode diffusion layer 30. With this kind of constitution, by performing peeling along the top surface or the bottom surface of the porous member 15, it is possible to easily replace the cathode diffusion layer 30. Besides, if one porous member 15 is arranged between the anode catalyst layer 40 and the anode diffusion layer 50, by performing peeling along the top surface or the bottom surface of the porous member 15, it is possible to easily replace the cathode diffusion layer 30. Note that the diffusion layers 20 and 40 are formed with a porous body of relatively high strength such as carbon paper, metal mesh or the like, so separation of the diffusion layers 20 and 40 and the porous member 15 is relatively easy.

Figure 18:
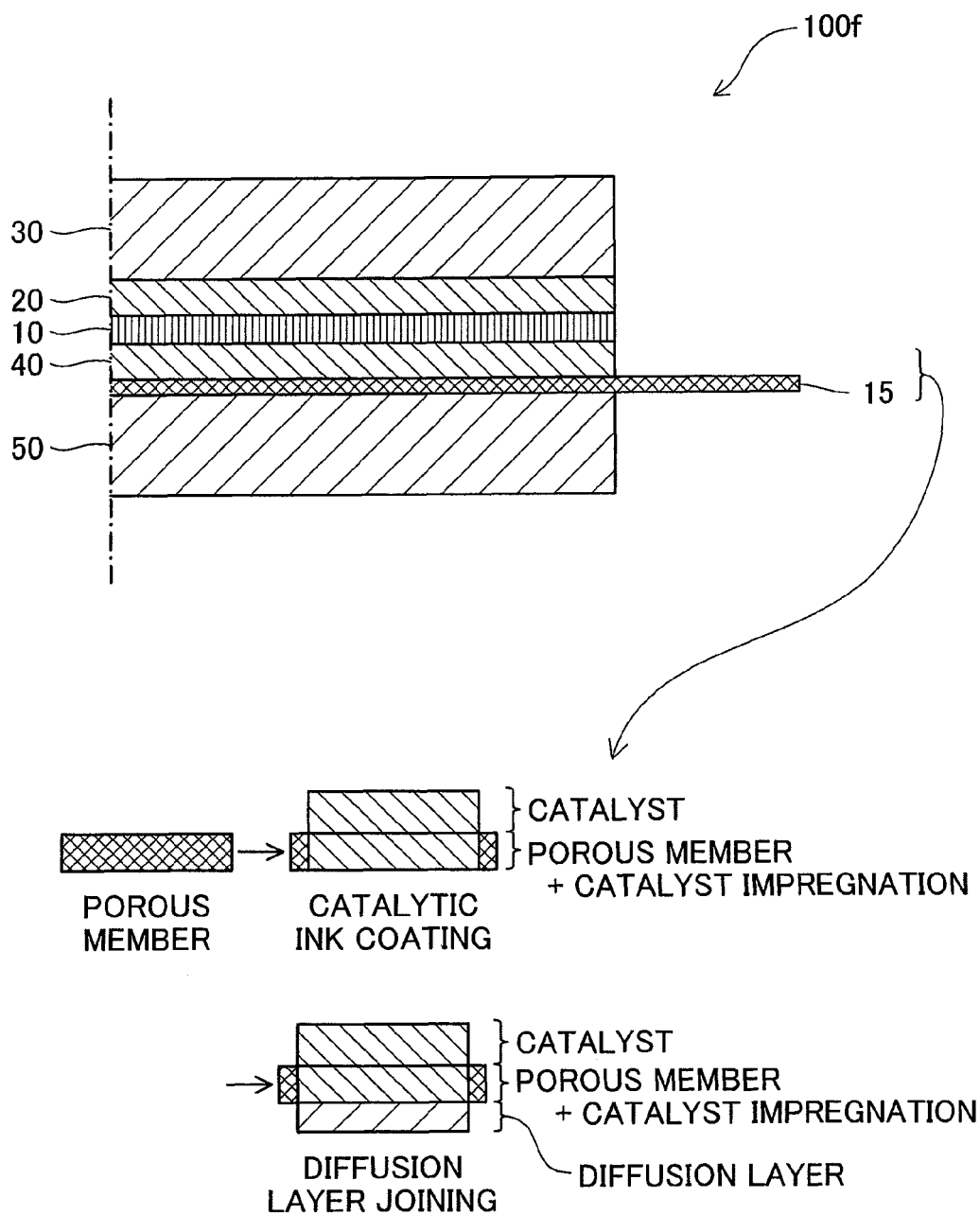
FIG. 18 is an explanatory drawing showing the method of arranging the porous member between the catalyst layer and the diffusion layer.

FIG. 18 is an explanatory drawing showing the method of arranging the porous member 15 between the catalyst layer 20 or 40 and the diffusion layer 30 or 50. With this method, first, the porous member 15 and a catalytic ink with relatively higher content ratio of ionomer than normal are prepared. Then, on one surface of the porous member 15, catalytic ink is coated so as to impregnate catalytic ink into the interior of the porous member 15. Then finally, the diffusion layer 30 or 50 is joined on the other surface of the porous member 15. By doing this, it is possible to arrange the porous members 15 between the catalyst layer 20 or 40 and the diffusion layer 30 or 50.

Seventh Embodiment

Figure 19:
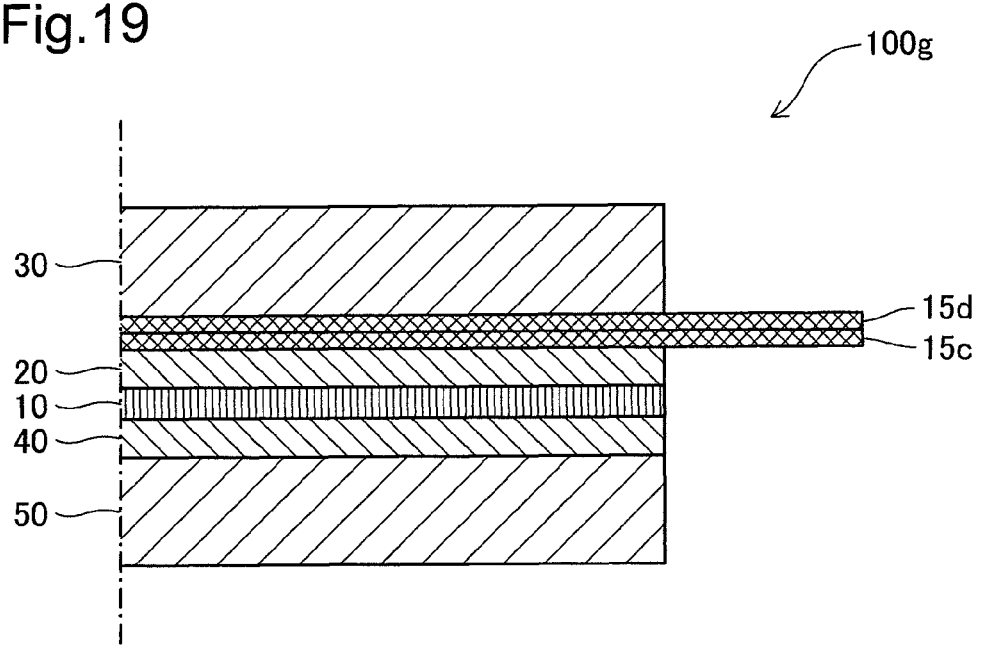
FIG. 19 is a partial cross section diagram showing the schematic structure of a membrane electrode assembly as the seventh embodiment.

FIG. 19 is a partial cross section diagram showing the schematic structure of a membrane electrode assembly 100g as the seventh embodiment. With this embodiment, two porous members 15c and 15d are arranged between the cathode catalyst layer 20 and the cathode diffusion layer 30. With this kind of constitution, it is possible to easily replace the cathode diffusion layer 30 without causing damage to the cathode catalyst layer 20 and the cathode diffusion layer 30. Besides, if two porous members 15 are arranged between the anode catalyst layer 40 and the anode diffusion layer 50, it is possible to easily replace the anode diffusion layer 50 without damaging the anode catalyst layer 40 and the anode diffusion layer 50. Note that the method of arranging two porous members 15 between the catalyst layer 20 or 40 and the diffusion layer 30 or 50 may be obtained by substituting the single porous member 15 in the method shown in FIG. 18 with two porous members 15.

Eighth Embodiment

Figure 20:
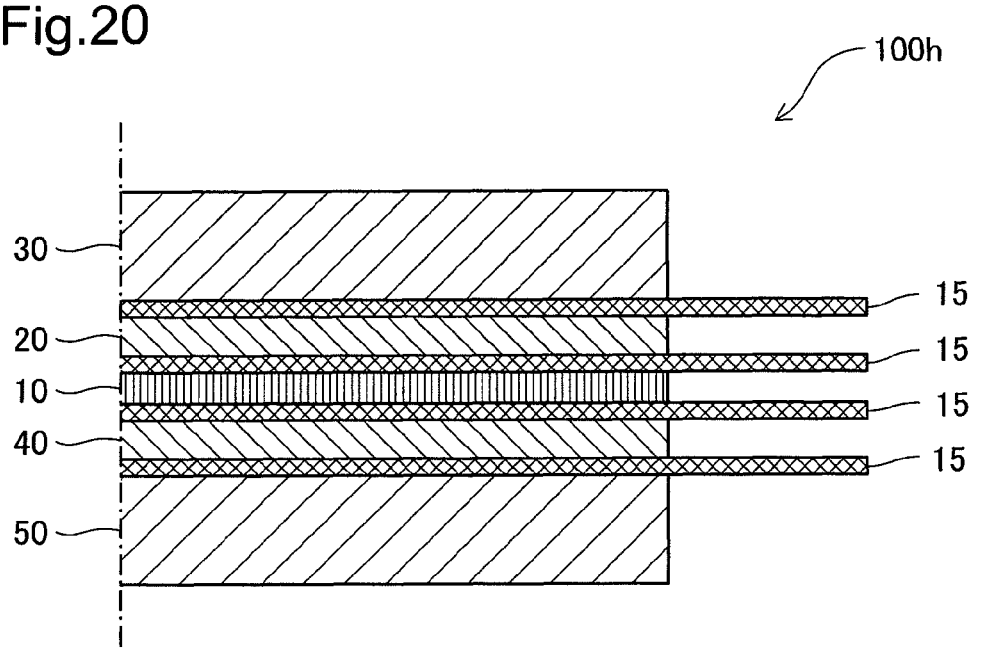
FIG. 20 is a partial cross section diagram showing the schematic structure of a membrane electrode assembly as the eighth embodiment.

FIG. 20 is a partial cross section diagram showing the schematic structure of a membrane electrode assembly 100h as the eighth embodiment. With this embodiment, one each of the porous member 15 is arranged between all the structural parts. With this kind of constitution as well, it is possible to perform replacement of each structural part by performing peeling from the top surface or bottom surface of each porous member 15.

Ninth Embodiment

Figure 21:
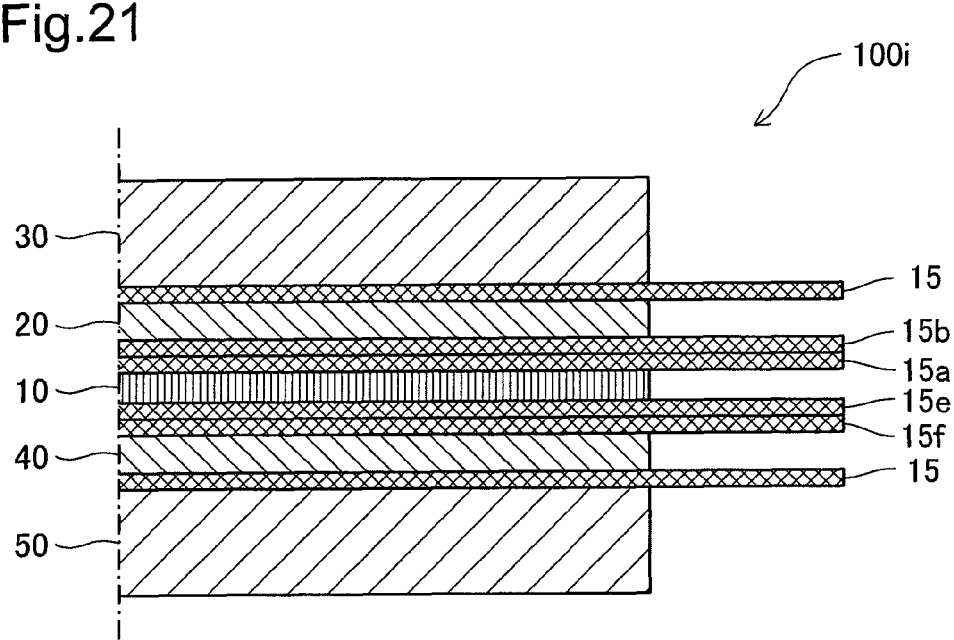
FIG. 21 is a partial cross section diagram showing the schematic structure of a membrane electrode assembly as the ninth embodiment.

FIG. 21 is a partial cross section diagram showing the schematic structure of a membrane electrode assembly 100i as the ninth embodiment. With this embodiment, two porous members 15 are respectively arranged between the electrolyte layer 10 and the cathode catalyst layer 20, and between the electrolyte layer 10 and the anode catalyst layer 40; and one porous member 15 is respectively arranged between the cathode catalyst layer 20 and the cathode diffusion layer 30, and between the anode catalyst layer 40 and the anode diffusion layer 50. With this kind of constitution, it is possible to easily replace each structural part without causing damage to the electrolyte layer 10 or the cathode catalyst layer 20 and the anode catalyst layer 40.

Various embodiments of the present invention are described above, but the present invention is not limited to these embodiments, and it is possible to use various constitutions without departing from the spirit and scope of the present invention. The number of porous members 15 arranged between each structural part is not limited to being one or two, and it may also be three or more. In addition, the following kind of variations are possible.

First Variation Example

Figure 22:
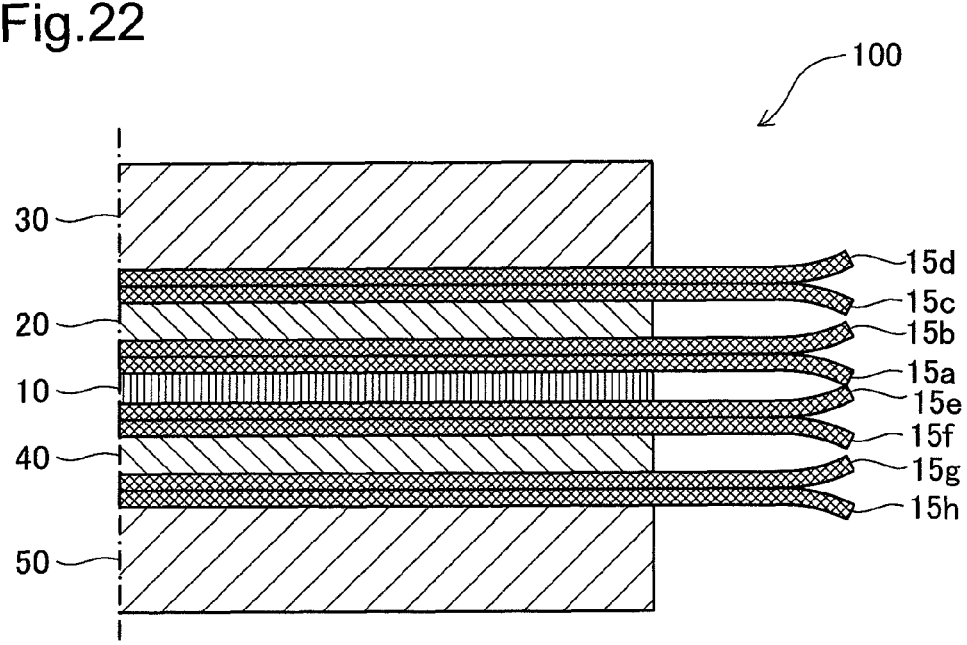
FIG. 22 is a partial cross section diagram showing the schematic structure of a membrane electrode assembly as a first variation example.

FIG. 22 is a partial cross section diagram showing the schematic structure of a membrane electrode assembly 100 as a first variation example. With this variation example, at the peripheral edge of the porous members 15, adjacent porous members 15 are constituted so as to be warped in respectively opposing directions to each other. By doing this, it is possible to perform peeling easily. Warping of the porous members 15 may be realized, for example, by giving a gradient of the resin ratio in the thickness direction of the porous member, or by performing a reforming process. Also, if the porous members 15 are made from multi-layering resins of different coefficients of thermal expansion, they may be warped by heating in the separation process.

Second Variation Example

Figure 23:
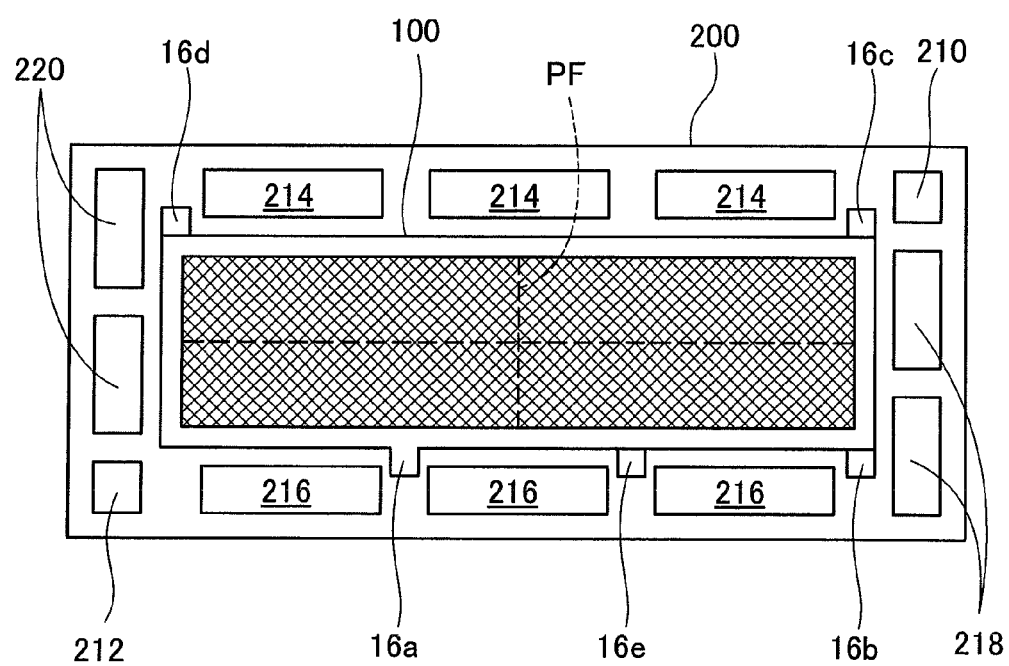
FIG. 23 is a drawing showing an aspect of the membrane electrode assembly as a second variation example.

FIG. 23 is a drawing showing an aspect of the membrane electrode assembly 100 as a second variation example. As shown in this FIG. 23, it is also possible to provide a perforation PF on the diffusion layers 30 and 50 and the catalyst layers 20 and 40 to divide these into a plurality of areas. By doing this, when there is partial degradation of the diffusion layers 30 and 50 and the catalyst layers 20 and 40, it is possible to cut out just that part and replace it.

Third Variation Example

With the first embodiment described above, both the peripheral edge portions of the porous members 15 and the tab portions 16 extend outside the respective structural parts of the membrane electrode assembly 100. In contrast to this, it is also possible extend only the tab portions 16 outside the respective structural parts. Also, if the peripheral edge portions of the porous members 15 are extended outside the respective structural parts, it is also possible to omit the tab portions 16. In addition, it is also possible to extend at least part of the porous members 15 outside the respective structural parts while the other portions are arranged further inside from the respective structural parts.

Fourth Variation Example

With the embodiments described above, a porous member impregnated with electrolyte is arranged between the electrolyte layer 10 and the catalyst layer 20. However, it is possible to use, for example, an electrolyte membrane in place of the porous member, as a member arranged between the electrolyte layer 10 and the catalyst layer 20. This electrolyte membrane may also be constituted using the same material as the electrolyte layer 10, but it is preferable to constitute it using a different material.

Fifth Variation Example

The membrane electrode assembly 100 shown in FIG. 1 may be manufactured using various methods other than the manufacturing method described above. For example, it is possible to manufacture using the first through fourth steps explained below. In the first step, a designated volume of a petroleum based auxiliary agent is added to PTFE fine powder and left for a designated time (e.g. approximately overnight), and a PTFE tape is obtained by molding this material using a paste extruder. Then, this PTFE tape is stretch calcinated to approximately 30 times at a temperature of 360° C. using a tenter type simultaneous biaxial stretcher or the like, whereby a porous member of visually approximately 0.3 mg/cm$^2$ (PTFE porous body) is obtained.

Subsequently, in the second step, an electrolyte membrane precursor, which has a dimensions smaller than the porous member generated with the first step (e.g. an item film formed to a thickness of approximately 15 μm using extrusion molding of a Nafion precursor pellet), is prepared. Then, on both surfaces of that electrolyte precursor membrane, two porous members generated at the first step are adhered. Then, mold release PTFE sheets are further adhered on the front and back, this is sandwiched by two silicone rubber sheets, and heat pressing is implemented at, for example a temperature of 230° C. for approximately 15 minutes. After heat pressing, the PTFE sheet is peeled to obtain a melt impregnation composite of the electrolyte membrane precursor and the porous member. This material further undergoes hydrolysis processing with 9 mol/L sodium hydroxide at 90° C. for approximately 20 minutes, and water washing is performed until pH 7 is reached. Then, this is immersed for about 30 minutes in 1 mol/L nitric acid solution, and water washing and drying are done to obtain a product material for which two porous members are arranged on the front and back of the electrolyte membrane.

In the third step, a carbon fiber base material or carbon containing stretched PTFE is prepared as the porous member to be arranged between the catalyst layer 20 or 40 and the diffusion layer 30 or 50. Then, after immersing this porous member in an electrolyte solution and drying it, its surface is further coated with an electrolyte solution. Then, before this coated electrolyte solution dries, another layer of the porous member generated at the first step is overlaid, and a catalytic ink is coated on that. As a result, it is possible to obtain a target object for which two porous members are arranged on one surface of the catalyst layer 20 or 40.

In the fourth step, the third-step products are disposed on the front and back surfaces of the second-step product such that the catalytic-ink-coated surfaces of the third step products are in contact with the front and back surfaces of the second step product, and heat pressing is performed. Then, on its both surfaces are joined the diffusion layers 30 and 50 respectively. With the manufacturing method described above as well, it is possible to manufacture a membrane electrode assembly for which two porous members are arranged between respective structural parts.

EXPLANATION OF REFERENCE CHARACTERS

10 Electrolyte layer
15, 15*a* to 15*h* Porous member
16, 16*a* to 16*e* Tab portion
17, 17*a* to 17*e* Tab fitting portion
20 Cathode catalyst layer
30 Cathode diffusion layer
40 Anode catalyst layer
50 Anode diffusion layer
100, 100*b* to 100*i* Membrane electrode assembly
200 Separator
210 Opening
210 Opening for hydrogen supply
212 Opening for anode off gas exhaust
214 Opening for cathode-off gas exhaust
216 Opening for air supply
218 Opening for cooling water supply
220 Opening for cooling water exhaust
PF Perforation

What is claimed is:

1. A membrane electrode assembly disposed inside a fuel cell having an air supply opening and a cathode off-gas exhaust opening, comprising:
    an electrolyte layer;
    a catalyst layer;
    a gas diffusion layer; and
    a member having electric conductivity arranged between the catalyst layer and the gas diffusion layer, the member being in contact with both the catalyst layer and the gas diffusion layer, and the member being configured to peel apart the catalyst layer and the gas diffusion layer from each other when the membrane electrode assembly is disassembled,
    wherein the member is a porous member generated by impregnating a PTFE resin film with an ionomer and catalyst,
    wherein the member has an integrally formed tab portion extending outside peripheral edge portions of the catalyst layer and the gas diffusion layer;
    wherein the catalyst layer is a cathode catalyst layer, and
    wherein the tab portion is provided nearer the air supply opening of the fuel cell than the cathode-off gas exhaust opening of the fuel cell,
    wherein, as viewed in cross-section of the membrane electrode assembly, a plurality of the members are adjacent to each other, and at a peripheral edge of the adjacent members, the adjacent members are warped in respectively opposing directions away from each other,
    wherein each of the members including the tab portion are formed of multi-layering resins of different coefficients of thermal expansion, to allow the members to be warped by heating in a separation process.

2. The membrane electrode assembly according to claim 1, wherein at least one of the catalyst layer and the gas diffusion layer has a perforation to divide at least one of the catalyst layer and the gas diffusion layer into a plurality of predetermined areas, configured to allow one of the predetermined areas to be separated from the other predetermined areas.

3. A membrane electrode assembly disposed inside a fuel cell having an air supply opening and a cathode off-gas exhaust opening, comprising:
    an electrolyte layer;
    a catalyst layer;
    a gas diffusion layer; and
    a member having electric conductivity arranged between the catalyst layer and the gas diffusion layer, the member being in contact with both the catalyst layer and the gas diffusion layer, and the member being configured to peel apart the catalyst layer and the gas diffusion layer from each other when the membrane electrode assembly is disassembled,
    wherein the member is a porous member generated by impregnating a PTFE resin film with an ionomer and catalyst,
    wherein the member has an integrally formed tab portion extending outside peripheral edge portions of the catalyst layer and the gas diffusion layer;
    wherein the catalyst layer is a cathode catalyst layer,
        wherein the tab portion is provided nearer an air supply opening of a fuel cell than a cathode-off gas exhaust opening of the fuel cell, and
        wherein at least one of the catalyst layer and the gas diffusion layer has a perforation to divide at least one of the catalyst layer and the gas diffusion layer into a plurality of predetermined areas configured to allow one of the predetermined areas to be separated from the other predetermined areas.

\* \* \* \* \*